(12) United States Patent
Ghose et al.

(10) Patent No.: US 11,842,367 B1
(45) Date of Patent: Dec. 12, 2023

(54) APPARATUS AND METHOD FOR IDENTIFYING CANDIDATE BRAND NAMES FOR AN AD CLIP OF A QUERY VIDEO ADVERTISEMENT USING OCR DATA

(71) Applicant: Alphonso Inc., Mountain View, CA (US)

(72) Inventors: Susmita Ghose, Mountain View, CA (US); Aayush Agrawal, Jabalpur (IN)

(73) Assignee: ALPHONSO INC., Mountain View, CA (US)

( * ) Notice: Subject to any disclaimer, the term of this patent is extended or adjusted under 35 U.S.C. 154(b) by 0 days.

(21) Appl. No.: 17/365,273

(22) Filed: Jul. 1, 2021

(51) Int. Cl.
| | | |
|---|---|---|
| *G06Q 30/0242* | (2023.01) | |
| *G06F 16/438* | (2019.01) | |
| *G06F 16/432* | (2019.01) | |
| *G06F 16/435* | (2019.01) | |
| *G06V 30/224* | (2022.01) | |

(52) U.S. Cl.
CPC ....... *G06Q 30/0243* (2013.01); *G06F 16/434* (2019.01); *G06F 16/435* (2019.01); *G06F 16/438* (2019.01); *G06Q 30/0244* (2013.01); *G06V 30/224* (2022.01)

(58) Field of Classification Search
CPC ............ G06Q 30/0243; G06Q 30/0244; G06F 16/434; G06F 16/435; G06F 16/438; G06V 30/224
See application file for complete search history.

(56) References Cited

U.S. PATENT DOCUMENTS 10,182,256 B1 * 1/2019 Kalampoukas ...... H04N 21/233
10,237,610 B1 * 3/2019 Kalampoukas ..... G06F 16/7844
(Continued)

OTHER PUBLICATIONS

Husna et al., "Statistical Approach for Classifying Sentiment Reviews by Reducing Dimension using Truncated Singular Value Decomposition," 1st International Conference on Advances in Science, Engineering and Robotics Technology 2019 (ICASERT 2019) © 2019 IEEE.

(Continued)

*Primary Examiner* — Arthur Duran
(74) *Attorney, Agent, or Firm* — Panitch Schwarze Belisario & Nadel LLP

(57) ABSTRACT

Candidate brands are identified for an ad clip of a query video advertisement using two different techniques. Optical character recognition (OCR) is performed on a thumbnail of a plurality of different video ads in a curated database that includes brand-identifying metadata. In one technique, text vectorization is performed for each brand using all of the text that is extracted from each of the thumbnails for each brand, thereby providing a numerical brand embedding for each brand, a similar text vectorization is performed on the query video ad, and then a comparison is made between the embeddings to identify highest-ranking candidate brands based on brand-level identification. In another technique, a transformer-based model generates numerical embeddings for each ad clip in the curated database, and a comparison is made to these clip-based numerical embeddings to identify highest-ranking candidate brands based on clip-level identification. The results of the two techniques are combined together to provide one or more overall highest-ranking candidate brands.

14 Claims, 9 Drawing Sheets

(56) References Cited

U.S. PATENT DOCUMENTS

| | | | |
|---|---|---|---|
| 10,306,304 B1* | 5/2019 | Kalampoukas | H04N 21/26603 |
| 10,601,852 B2* | 3/2020 | Takahashi | G06F 21/554 |
| 10,733,177 B1* | 8/2020 | Kenthapadi | H04W 12/00 |
| 10,762,375 B2 | 9/2020 | Ronen et al. | |
| 10,769,502 B1* | 9/2020 | Berg | G06F 16/56 |
| 11,580,737 B1* | 2/2023 | Miller-Smith | G06V 10/762 |
| 2003/0004966 A1* | 1/2003 | Bolle | G06F 16/735 |
| 2003/0033347 A1* | 2/2003 | Bolle | G06F 16/7834 |
| | | | 718/107 |
| 2014/0201180 A1* | 7/2014 | Fatourechi | G06F 16/48 |
| | | | 707/706 |
| 2014/0257995 A1* | 9/2014 | Wang | H04N 21/44016 |
| | | | 705/14.66 |
| 2017/0235735 A1* | 8/2017 | Ignatyev | G06N 5/047 |
| | | | 706/12 |
| 2019/0173902 A1* | 6/2019 | Takahashi | G06K 9/6232 |
| 2020/0195983 A1* | 6/2020 | Chao | H04N 21/23418 |
| 2020/0210442 A1* | 7/2020 | Bergeron | G06F 16/2365 |
| 2020/0226646 A1* | 7/2020 | Awoyemi | G06Q 50/188 |
| 2020/0273062 A1* | 8/2020 | Probell | G06Q 30/0255 |
| 2021/0357378 A1* | 11/2021 | Urdiales | G06F 16/24556 |
| 2021/0374098 A1* | 12/2021 | Holmdahl | G06N 3/08 |
| 2021/0382605 A1* | 12/2021 | Edwards | G06F 3/167 |
| 2022/0107852 A1* | 4/2022 | Kulkarni | G06F 9/542 |
| 2022/0199079 A1* | 6/2022 | Hanson | H04L 51/02 |
| 2022/0237368 A1* | 7/2022 | Tran | G06N 3/045 |

OTHER PUBLICATIONS

Sankirti et al., "Video OCR for Video Indexing," IACSIT International Journal of Engineering and Technology, vol. 3, No. 3, pp. 287-289 (Jun. 2011).

* cited by examiner

Curated database 500

| video advertisement | thumbnail image | brand (metadata) |
|---|---|---|
| | | |
| 12345678 | | Toyota of Orlando |
| 12345679 | | Toyota of Orlando |
| | | |
| 12345678 | | Toyota of Clermont |
| | | |
| 14466889 | | Toyota |
| 14599601 | | Toyota |
| 15654291 | | Toyota |
| | | |
| ⋮ | | ⋮ |
| | | |
| | | |

Figure 5

Brand embeddings database 600

| brand (metadata) | numerical brand embedding |
|---|---|
| | |
| Toyota of Orlando | |
| Toyota of Clermont | |
| Toyota | |
| ⋮ | |
| | |
| | |

Figure 6

Clips embedding database 700

| video advertisement | extracted text of thumbnail image | numerical embedding for the extracted text of thumbnail image |
|---|---|---|
|  |  |  |
| 12345678 |  |  |
| 12345679 |  |  |
|  |  |  |
| 12345680 |  |  |
|  |  |  |
| 14466889 |  |  |
| 14599601 |  |  |
| 15654291 |  |  |
|  |  |  |
| ⋮ |  |  |
|  |  |  |
|  |  |  |

Figure 7

APPARATUS AND METHOD FOR IDENTIFYING CANDIDATE BRAND NAMES FOR AN AD CLIP OF A QUERY VIDEO ADVERTISEMENT USING OCR DATA

BACKGROUND OF THE INVENTION

A business model of certain companies today require that they maintain an inventory of all currently airing or streaming commercial advertisements (ads). However, unlike program content which is published in electronic program guides, there is no publicly disseminated source of aired or streamed ads. Accordingly, the burden falls on such companies to identify and catalog the ads. Thousands of new ads are aired or streamed each day, and thus new ad candidates must be collected and analyzed every day to determine which ones to add to the existing inventory. New ads must also be classified and tagged. Part of the classification and tagging process is to associate every new ad with appropriate metadata information, such as brand name, category of advertisements, and product name. The process of associating ad clips with appropriate metadata should ideally be automated to the maximum extent possible. The present invention provides such an automated process.

SUMMARY OF THE PRESENT INVENTION

Candidate brands are identified for an ad clip of a query video advertisement using two different techniques. Optical character recognition (OCR) is performed on a thumbnail of a plurality of different video ads in a curated database that includes brand-identifying metadata. In one technique, text vectorization is performed for each brand using all of the text that is extracted from each of the thumbnails for each brand, thereby providing a numerical brand embedding for each brand, a similar text vectorization is performed on the query video ad, and then a comparison is made between the embeddings to identify highest-ranking candidate brands based on brand-level identification. In another technique, a transformer-based model generates numerical embeddings for each ad clip in the curated database, and a comparison is made to these clip-based numerical embeddings to identify highest-ranking candidate brands based on clip-level identification. The results of the two techniques are combined together to provide one or more overall highest-ranking candidate brands.

BRIEF DESCRIPTION OF THE DRAWINGS

Preferred embodiments of the present invention will now be described by way of example with reference to the accompanying drawings:

FIGS. 5-7 are views of database tables used in preferred embodiments of the present invention.

DETAILED DESCRIPTION OF THE INVENTION

Certain terminology is used herein for convenience only and is not to be taken as a limitation on the present invention. The words "a" and "an", as used in the claims and in the corresponding portions of the specification, mean "at least one."

I. OVERVIEW

Given a new ad clip, the most critical information to identify for each clip is the name of the brand that it advertises. This is because given a brand, an existing clip classification and categorization system can automatically identify appropriate metadata and associate them with the clip under processing, thereby accomplishing the clip metadata tagging goal.

Preferred embodiments of the present invention extract data from ad clips through Optical Character Recognition (OCR), which is then used in automating the assignment of correct metadata to each clip. The process of using OCR data for such a purpose presents numerous challenges, even if the OCR data returned from images extracted from a clip are 100% accurate. In practice, however, it is common with OCR that the data returned should be assumed and expected to have lexicographical errors (misspellings), numerical errors, and the like. Also, since there is a very large universe of possible labels (brands) to classify from, this becomes a significantly difficult, extreme multi-label classification problem. The number of brands can be in the tens of thousands and potentially even in the hundreds of thousands in number.

The methodology described herein leverages Machine Learning (ML) concepts to accurately identify the brand name for a given clip, even in the presence of spelling errors, and measures the efficacy of the method against an actual set of clips.

II. DETAILED DISCLOSURE a. Input to Brand Identification Framework

The discussion below describes what forms the input to the automatic brand identification process using OCR data.

Figure 1A:
FIG. 1A is a thumbnail of an ad clip that is used to illustrate preferred embodiments of the present invention.

FIG. 1 is a thumbnail of an ad clip. Referring to FIG. 1, the text detected in the thumbnail using OCR technology is as follows ("\n" designates a new line):

"OPEN 'TIL 10 PM\nO TOYOTA of Orlando O TOYOTA of Clermont\n1-4 Across From Millenia Mall Highway 50 West of the Turnpike\n"

Figure 1B:
FIG. 1B is a thumbnail of an ad clip that is used to illustrate another preferred embodiments of the present invention.

Using the text extracted using OCR as input, the desired goal is then to identify that the brand of the corresponding ad is "Toyota of Orlando" and/or "Toyota of Clermont". (Most ads will only have one identified brand, such as shown in FIG. 1B)

b. Methodology

The first step is to identify a set of creatives (ad clips) that will serve as the training data set. An existing catalog of ads may be used for this purpose. The ads in the existing catalog are already curated and contain the desired metadata.

The final model consists of two components, namely, Brand Level Identification and Clip Level Identification. As discussed in more detail below, the results of these two components are preferably aggregated for improved accuracy.

Figure 2:
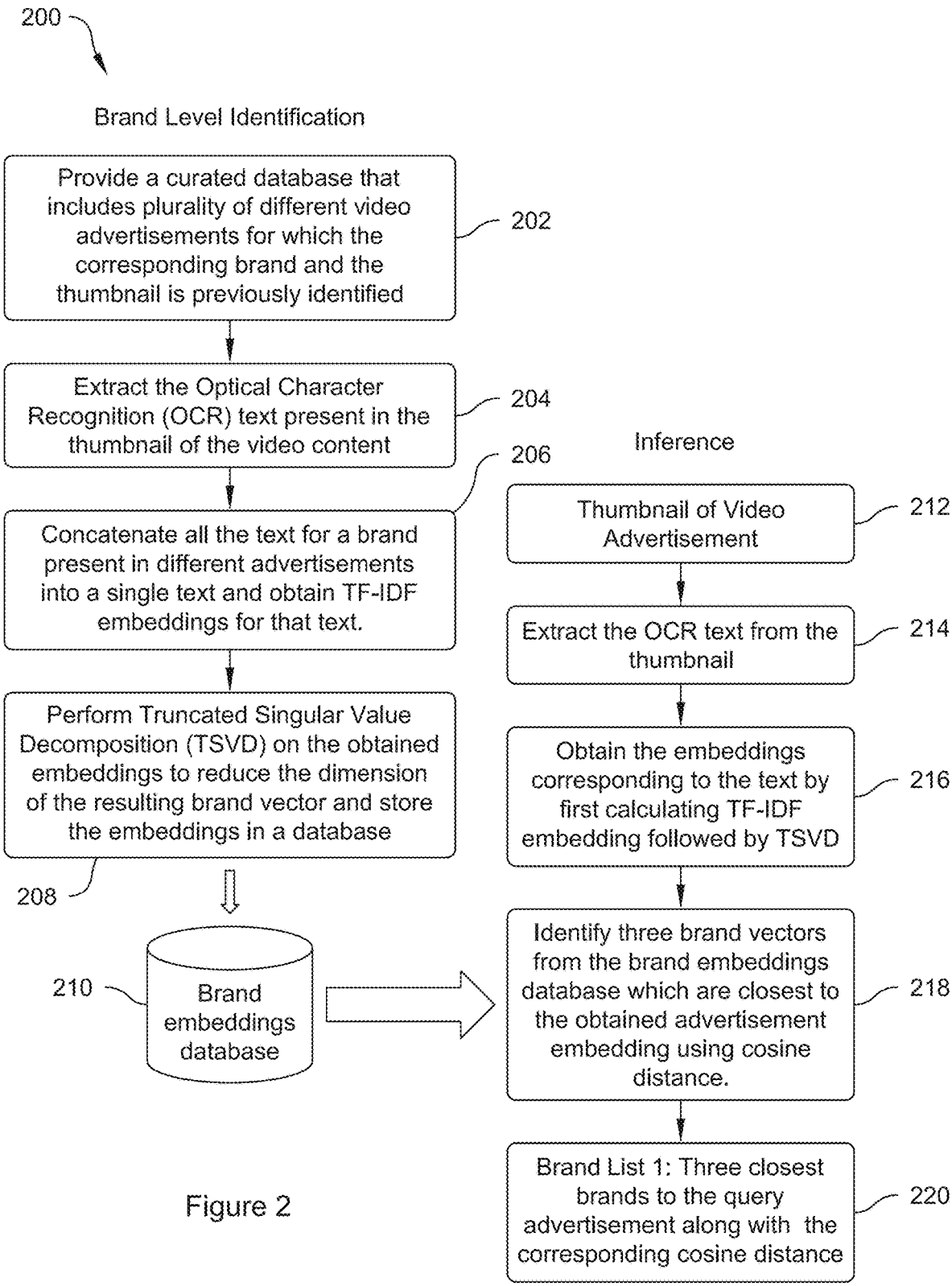
FIGS. 2-4 are flowcharts for preferred embodiments of the present invention.
Figure 3:
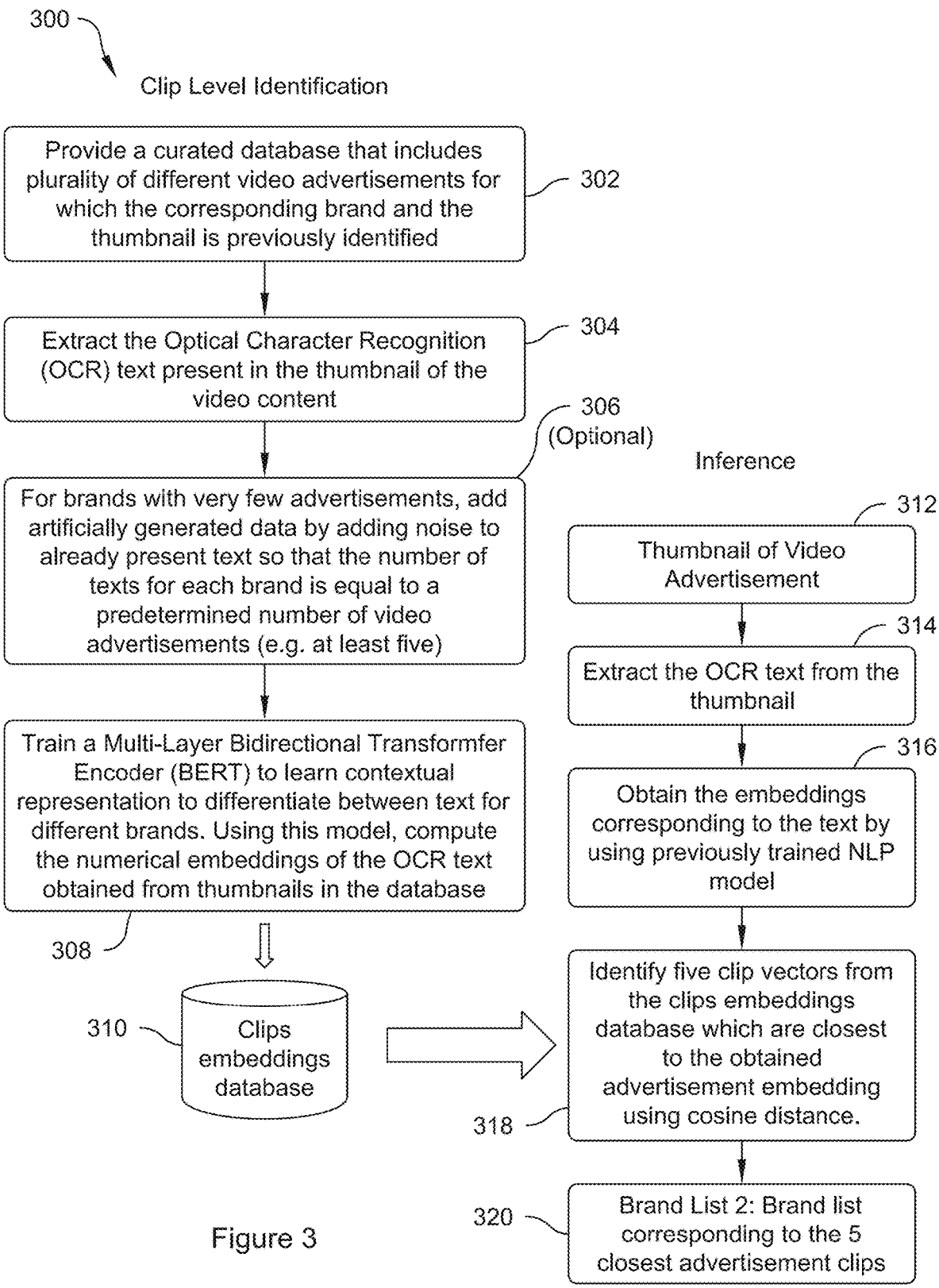
Figure 4:
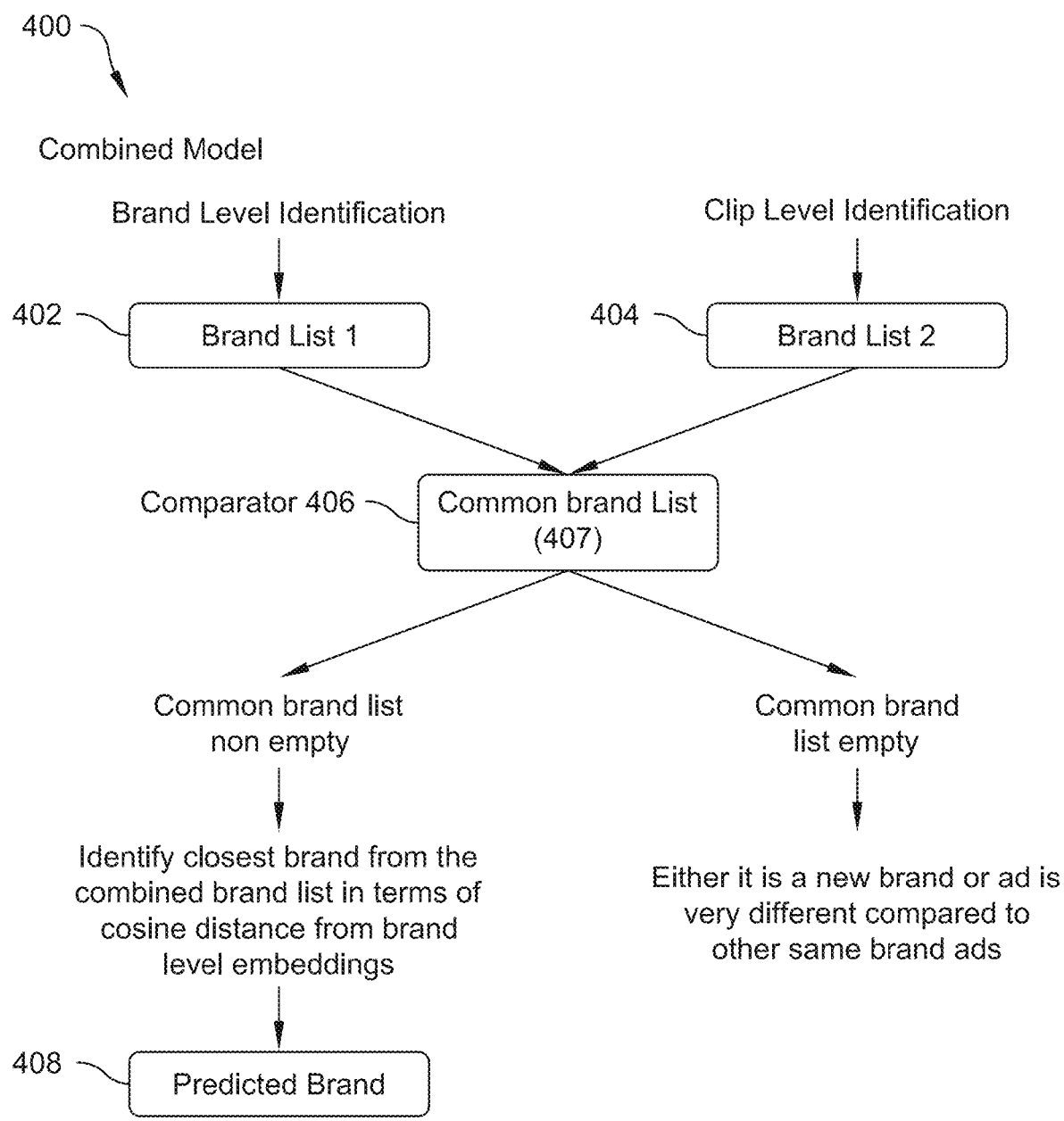

The methodology is described below with respect to FIGS. 2-4. The Brand Level Identification and Clip Level Identification start with the same two steps, as follows:

Step 202, 302: Provide a curated database that includes a plurality of different video ads for which the corresponding brand and the thumbnail is previously identified.

Steps 204, 304: Extract the OCR text present in the thumbnail of the video content.

The remaining steps of the Brand Level Identification and Clip Level Identification differ from each other, as described below.

1. Brand level identification (200): This process, illustrated in FIG. 2, involves identifying the nearest brand given the query OCR text, and operates as follows:
   i. For each of the brands in a reference data set (training data set), convert the entire OCR text for that brand into a numerical vector (also referred to herein as a "numerical brand embedding" for each brand). The numerical brand embedding is effectively a signature for the brand. One preferred process for performing this text vectorization is to first divide the entire text into smaller parts (tokenization) and then use the Term Frequency-Inverse Document Frequency (TF-IDF) vectorizer followed by a dimension reduction method, such as Truncated Singular Value Decomposition (TSVD). This vectorization then gives a numerical representation (the "numerical brand embedding") for each brand in the data which captures the information about all words that occur, frequency of those words within the text and commonality of different words across different ads. These steps are shown in FIG. 2 as follows:
   Step 206: Concatenate all of the text for a brand present in different ads into a single text and obtain TF-IDF embeddings for that text.)
   Step 208: Perform TSVD on the obtained embeddings to reduce the dimension of the resulting brand vector and store the embeddings in a database.
   ii. Store the numerical brand embeddings for each brand in a brand embeddings database (Step 210).
   iii. Inference process: For any new ad for which the brand needs to be identified, obtain the vector (also referred to herein as a "numerical embedding") for the text in the thumbnail of the ad in the same manner as described above for the reference data set. Then, find the brand vectors in the brand embeddings database that are closest to this query text vector in terms of cosine distances so as to identify the top brands to which this ad is most similar. For example, one can find the three closest brand vectors to this query text vector in terms of cosine distances so as to identify the top three brands to which this ad is most similar. A corresponding distance value is also obtained so as to quantify the similarity and rank the brands accordingly. These steps are shown in FIG. 2 as follows:
   Step 212: Thumbnail of Video Advertisement
   Step 214: Extract the OCR text from the thumbnail
   Step 216: Obtain the embeddings corresponding to the text by first calculating TF-IDF embeddings followed by TSVD
   Step 218: Identify three brand vectors from the brand embeddings database which are closest to the obtained advertisement embeddings using cosine distance
   Step 220: Brand List 1: Three closest brands to the query ad along with the corresponding cosine distance 2. Clip level identification (300): This process involves identifying the advertisement clip which is closest to the query advertisement clip in terms of text that is present in the thumbnail in both of them, and operates as follows:
   i. (Optional) For brands with very few ads, add artificially generated data by adding noise to already present text so that the number of texts for each brand is at least five (Step 306). The scope of the present invention includes other predetermined numbers of video ads other than five. This optional step improves performance when a brand has only very few ads. However, it is not a necessary step. Also, given a sufficiently large curated database, most brands will already have a sufficient number of video ads.
   FIG. 1B is a thumbnail of an ad clip that is used to illustrate one example of noise generation is as follows (Original Text is extracted from the ad clip of FIG. 1B):
   Original Text: thedogstop.com/pgh grooming daycare boarding training in-home retail Noisy Text 1: thedo98tup com/pgh grooming daycake 6oakding training in—home retail Noisy Text 2: thedogstop. com/p9h grooming daycake boarding training in—home retail
   ii. Obtain a numerical representation of text corresponding to each clip in the training data set. This numerical embedding captures the context of the text of the thumbnail for each clip. In one preferred embodiment, the numerical embeddings are obtained from a fine-tuned transformer-based model, such as a Bidirectional Encoder Representations from Transformers (BERT) language model. See step 308: Train a Multi-Layer BERT to learn contextual representation to differentiate between text for different brands. Using this model, compute the numerical embeddings of the OCR text obtained from thumbnails in the database. If optional noise is added, additional numerical embeddings are created for the brand using one or more of the existing extracted text from a thumbnail of the brand so that there are at least a total of five numerical embeddings for a brand, and thus there would be numerical embeddings for the text of existing (actual) thumbnails, as well as numerical embeddings for the noise-related text. In the example above, three distinct numerical embeddings would be created, one for the original text, and one for each of the noise text examples.
   iii. Store the numerical embeddings for the text of the thumbnail for each clip in a clips embeddings database along with the corresponding brand (Step 310).
   iv. For any new ad for which the brand needs to be identified, obtain the context-based numerical embedding from the same model as used for obtaining the numerical embeddings for each clip in the training data set. Then find the closest clips to this query clip in terms of the distance between the obtained numerical embeddings so as to identify a list of brands corresponding to these closest clips. The list of brands acts as the candidate brands for the clip level identification. For example, one can find the five closest clips to this query clip, and thereby obtain a list of brands corresponding to these five closest clips. These steps are shown in FIG. 3 as follows:
   Step 312: Thumbnail of Video Advertisement
   Step 314: Extract the OCR text from the thumbnail
   Step 316: Obtain the embeddings corresponding to the text using previously trained NLP model (The previously trained NLP model refers to the natural language processing (NLP) model of step 308.)
   Step 318: Identify five clip vectors from the clips embeddings database which are closest to the obtained advertisement embeddings using cosine distance
   Step 320: Brand List 2: Brand list corresponding to the 5 closest ad clips The use of five clip vectors is a design choice and the scope of the present invention includes other numbers of clip vectors of similar magnitude as five.

In clip level identification, there is no single numerical embedding for a brand as generated in the brand level identification. Instead, a numerical embedding is associated with each ad, and becomes stored in the clips embedding database.

3. Aggregation of results

The results from the Clip level identification and the Brand level identification may then be aggregated. To do this, look for the closest brand in the list generated for the brand level identification which is also present in the list generated for the clip level identification. If such a brand exists, that brand is used as the final prediction. In the case when no such common brand exists, the clip is skipped for now so that it can be handled later separately. When given sufficiently large reference data set (training data set), a brand should be identified in the vast majority of cases. These steps are shown in FIG. 4 as follows:

Brand List 1 (402) from the brand level identification is compared with Brand List 2 (404) from the clip level identification in comparator 406 to obtain a common brand list (407). If the common brand list is non-empty, identify the closest brand from the combined brand list in terms of cosine distance from brand level embeddings. The closest brand is the Predicted Brand (408). If the common brand list is empty, this means that the ad is for a new brand that is not present in the curated database, or that the ad is very different compared to other same brand ads. If the common brand list is empty, manual analysis of the ad may thus be required to identify the brand.

4. Reference Data Set

In one preferred embodiment, the reference data set (training data set) used in the modelling may consist of about 500,000 ads. Each ad contains text that is extracted through OCR. These ads may correspond to about 20,000 brands which are distributed across various categories.

5. Cosine Distance

Cosine Similarity formula:

$$S_c(A, B) = \frac{\sum_{i=1}^{n} A_i B_i}{\sqrt{\sum_{i=1}^{n} A_i^2} \sqrt{\sum_{i=1}^{n} B_i^2}}$$

Cosine Distance formula: $D_C(A, B) = 1 - S_C(A, B)$

Figure 8:
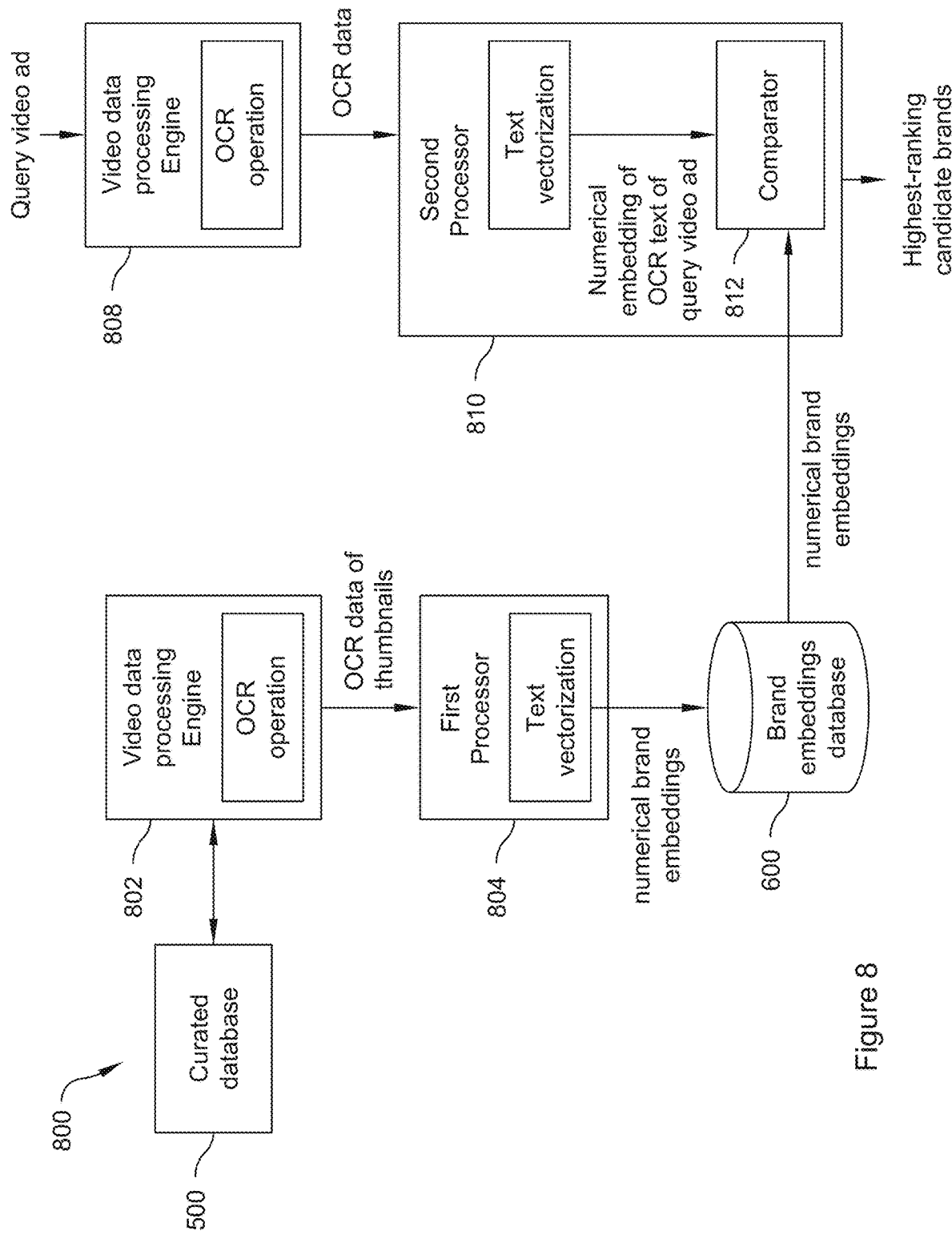
FIGS. 8 and 9 are schematic diagrams systems for implementing preferred embodiments of the present invention.
Figure 9:
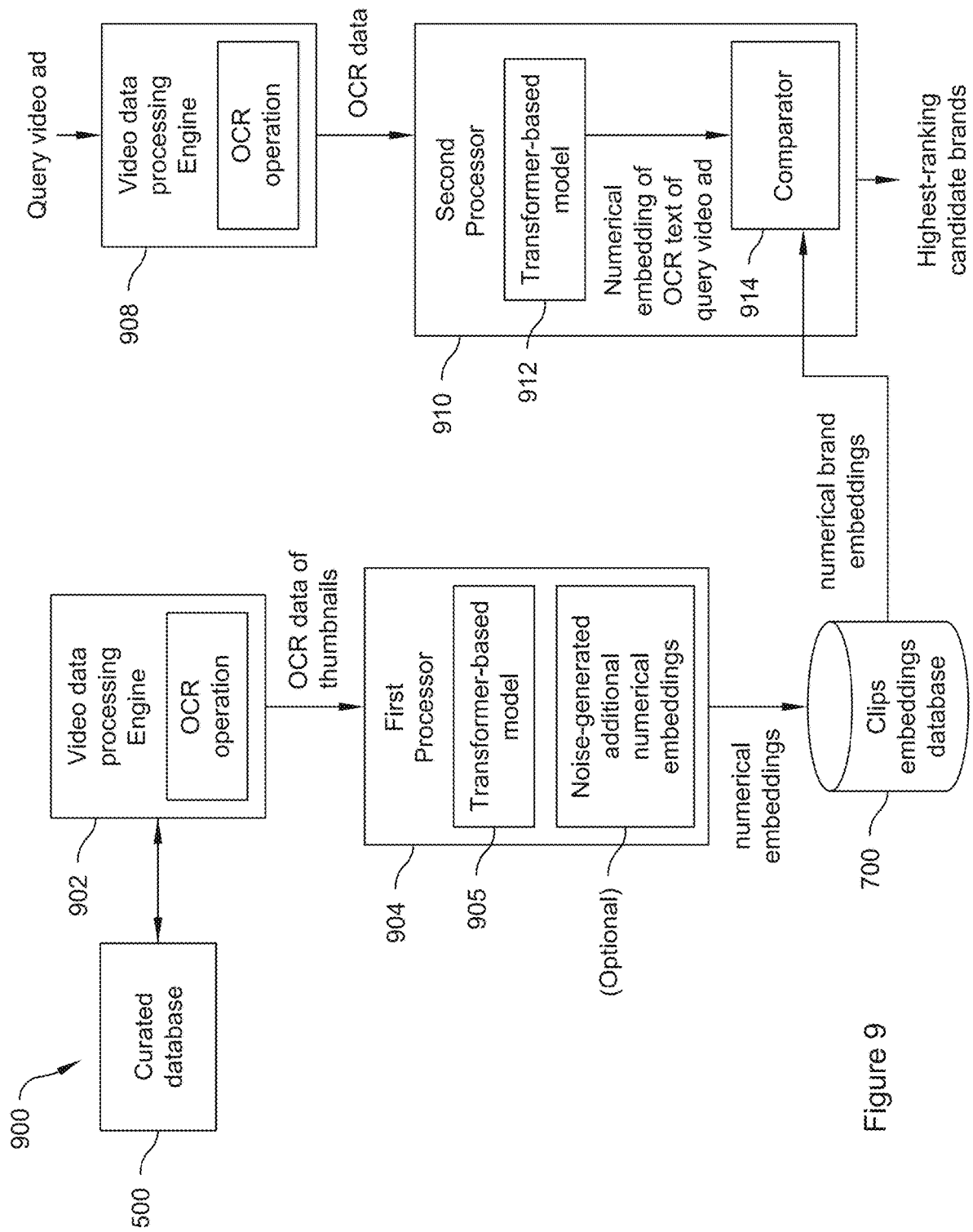

6. TF-IDF Embeddings tf-idf(t, d)=tf(t,d)*idf(t)

tf(t, d)=Number of times term t occur in a given document d $$idf(t) = \log\left(\frac{1+n}{1+df(t)}\right) + 1$$

where n is the number of documents and df(t) is the number of documents that contain term t FIGS. 5-9 are diagrams of apparatus elements for implementing preferred embodiments of the present invention. FIG. 5 shows fields of a sample curated database 500. FIG. 6 shows fields of a sample brand embeddings database 600. FIG. 7 shows fields of a sample clips embedding database 700. FIG. 8 shows a schematic diagram of a system (apparatus) 800 for implementing one preferred embodiment of brand level identification. FIG. 9 shows a schematic diagram of a system (apparatus) 900 for implementing one preferred embodiment of clip level identification.

Referring to FIGS. 5, 6, and 8, the system 800 identifies candidate brands for an ad clip of a query video advertisement. (A query video advertisement is a video advertisement that has no previously identified brand.) The system 800 includes the curated database 500, video data processing engines 802 and 808, first processor 804, second processor 810, and the brand embeddings database 600. In operation, the system 800 functions as follows:

The curated database 500 provides a plurality of different video advertisements, each video advertisement including a thumbnail thereof. The curated database 500 includes metadata that identifies the brand corresponding to each video advertisement and its respective thumbnail.

The video data processing engine 802 performs an OCR operation on each of the thumbnails stored in the curated database 500, thereby extracting text that is present in each of the thumbnails. The first processor 804 performs text vectorization for each brand using all of the text that is extracted from each of the thumbnails for each brand. The text vectorization provides a numerical brand embedding for each brand. The brand embeddings database 600 stores the numerical brand embedding for each brand.

Candidate brands are identified for the ad clip of the query video advertisement as follows:

1. The video data processing engine 808 performs an OCR operation on a thumbnail of the query video ad, thereby extracting text that is present in the thumbnail. The video data processing engine 808 may be the same video data processing engine 802 that is used for processing the thumbnails in the curated database 500, or it may be a separate video data processing engine.

2. The second processor 810 performs text vectorization on OCR text of the thumbnail of the query video advertisement, thereby obtaining a numerical embedding for the query video advertisement. The second processor 810 may be the same processor as the first processor 804 since both processors perform the same text vectorization process, or it may be a separate processor.

3. The second processor 810 also includes a comparator 812 which identifies highest-ranking (top-ranking) candidate brands by identifying the numerical brand embeddings in the brand embeddings database 600 which are closest to the numerical embedding for the query video advertisement. As discussed above, one preferred embodiment for performing this comparison/identification is to use cosine distance. The highest-ranking (top-ranking) candidate brands correspond to the Brand List 1 shown in FIGS. 2 and 4.

Referring to FIGS. 5, 7, and 9, system (apparatus) 900 also identifies candidate brands for an ad clip of a query video advertisement. The system 900 includes the curated database 500, video data processing engines 902 and 908, first processor 904 (also, referred to as a "third processor"), second processor 910 (also, referred to as a "fourth processor"), and the clips embeddings database 700. In operation, the system 900 functions as follows:

Similar to FIG. 8, the curated database 500 provides a plurality of different video advertisements, each video advertisement including a thumbnail thereof. The curated database 500 includes metadata that identifies the brand corresponding to each video advertisement and its respective thumbnail.

Similar to FIG. 8, the video data processing engine 902 performs an OCR operation on each of the thumbnails stored in the curated database 500, thereby extracting text that is present in each of the thumbnails.

The first processor 904 computes numerical embeddings of the extracted text that is present in each of the thumbnails using transformer-based model 905 that is trained to learn contextual representation to differentiate between text for different brands. The numerical embeddings for each of the extracted text that is present in each of the thumbnails is stored in the clips embeddings database 700, along with the corresponding brand.

Candidate brands are identified for the ad clip of the query video advertisement as follows:

1. The video data processing engine 908 performs an OCR operation on a thumbnail of the query video ad, thereby extracting text that is present in the thumbnail. The video data processing engine 908 may be the same video data processing engine 902 that is used for processing the thumbnails in the curated database 500, or it may be a separate video data processing engine.
2. The second processor 910 computes a numerical embedding of OCR text of a thumbnail of the query video advertisement using transformer-based model 912. The transformer-based model is the same model 905 used in the first processor 904.
3. The second processor 910 also includes a comparator 914 which identifies highest-ranking (top-ranking) candidate brands by identifying the numerical embeddings in the clip embeddings database 700 which are closest to the numerical embedding for the query video advertisement. As discussed above, one preferred embodiment for performing this comparison/identification is to use cosine distance. The highest-ranking (top-ranking) candidate brands correspond to the Brand List 2 shown in FIGS. 3 and 4.

If additional numerical embeddings are created for brands having less than a predetermined number of video advertisements, the first processor 904 is further used to create the noise-generated additional numerical embeddings by adding noise to the extracted text for one or more of the existing video advertisements for the brand to create the additional numerical embeddings so that the total number of distinct numerical embeddings for the brand is at least equal to the predetermined number of video advertisements.

As discussed above, the combined model shown in FIG. 4 uses the outputs of respective FIGS. 8 and 9 to identify a predicted brand. The combined model is used in one preferred embodiment of the present invention. However, in alternative embodiments of the present invention, brand level identification or clip level identification may be used individually to identify the highest-ranking candidate brands. Thus, the scope of the present invention includes methods and systems that use either of these processes, namely, only the method and system illustrated in FIGS. 2 and 8, or only the method and system illustrated in FIGS. 3 and 9, as well as the combination of the processes, illustrated in FIGS. 2-3, 8-9, and FIG. 4.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A method for identifying candidate brands for an ad clip of a query video advertisement, the method comprising:
   (a) providing a curated database of a plurality of different video advertisements, each video advertisement including a thumbnail thereof, wherein the curated database includes metadata that identifies the brand corresponding to each video advertisement and its respective thumbnail;
   (b) performing, using a video data processing engine in communication with the curated database, an optical character recognition (OCR) operation on each of the thumbnails stored therein, thereby extracting text that is present in each of the thumbnails;
   (c) performing a brand level identification of candidate brands by:
      (i) performing, in a first processor, text vectorization for each brand using all of the text that is extracted from each of the thumbnails for each brand, wherein the text vectorization provides a numerical brand embedding for each brand,
      (ii) storing, in a brand embeddings database, the numerical brand embedding for each brand provided by the text vectorization, wherein the brand embeddings database includes a plurality of numerical brand embeddings provided by the respective text vectorizations, and
      (iii) identifying candidate brands for the ad clip of the query video advertisement by:
         (A) performing, in a second processor, text vectorization on OCR text of a thumbnail of the query video advertisement, thereby obtaining a numerical embedding for the query video advertisement, and
         (B) identifying, using the second processor, highest-ranking candidate brands by identifying the numerical brand embeddings in the brand embeddings database which are closest to the numerical embedding for the query video advertisement,
      wherein the candidate brands based on brand-level identification are the highest-ranking candidate brands;
   (d) performing a clip level identification of candidate brands by:
      (i) computing, in a third processor, numerical embeddings of the extracted text that is present in each of the thumbnails using a transformer-based model that is trained to learn contextual representation to differentiate between text for different brands,
      (ii) storing, in a clips embeddings database, the numerical embeddings for each of the extracted text that is present in each of the thumbnails, along with the corresponding brand, wherein the clips embeddings database includes a plurality of numerical embeddings, and
      (iii) identifying candidate brands for the ad clip of the query video advertisement by:
         (A) computing, in a fourth processor, a numerical embedding of OCR text of a thumbnail of the query video advertisement using the transformer-based model, and
         (B) identifying, using the fourth processor, highest-ranking candidate brands by identifying the numerical embeddings in the clips embeddings database which are closest to the numerical embedding of the query video advertisement,
wherein the candidate brands based on clip level identification are the highest-ranking candidate brands; and
(e) comparing, using a comparator, the highest-ranking candidate brands identified by the brand level identification of candidate brands with the highest-ranking candidate brands identified by the clip level identification of candidate brands, and generating a common brand list,
wherein when the common brand list is non-empty, the brands in the non-empty list are the candidate brands for the ad clip of the query video advertisement.

2. The method of claim 1 wherein when the common brand list is non-empty, a predicted brand is selected from the common brand list based on having a numerical embedding having a closest cosine distance from the numerical brand embeddings in the brand level embeddings.

3. The method of claim 1 wherein the text vectorization for each brand is performed by:
(i) concatenating all of the text for each brand from each of the different advertisements for the respective brand into a single text,
(ii) obtaining Term Frequency-Inverse Document Frequency (TF-IDF) embeddings for the single text of each brand, and
(iii) performing Truncated Singular Value Decomposition (TSVD) on the TF-IDF embeddings for the single text of each brand to reduce dimension of the numerical brand embedding.

4. The method of claim 1 wherein the text vectorization performed on the OCR text of a thumbnail of the query video advertisement is the same text vectorization that is performed for the text extracted from the thumbnails of the video advertisements in the curated database.

5. The method of claim 1 further comprising:
(f) for brands having less than a predetermined number of video advertisements, adding noise to the extracted text for one or more of the existing video advertisements for the brand to create one or more additional extracted text; and
(g) creating one or more additional numerical embeddings from the one or more additional extracted text so that the total number of distinct numerical embeddings for the brand is at least equal to the predetermined number of video advertisements,
wherein the numerical embeddings stored in the clips embeddings database for each of the extracted text that is present in each of the thumbnails also includes the numerical embeddings for the additionally created numerical embeddings.

6. The method of claim 5 wherein the predetermined number of video advertisements is at least five video advertisements.

7. The method of claim 1 wherein the transformer-based machine learning model is a Bidirectional Encoder Representations from Transformers (BERT) language model.

8. An apparatus for identifying candidate brands for an ad clip of a query video advertisement, the apparatus comprising:
(a) a curated database of a plurality of different video advertisements, each video advertisement including a thumbnail thereof, wherein the curated database includes metadata that identifies the brand corresponding to each video advertisement and its respective thumbnail;
(b) a video data processing engine in communication with the curated database configured to perform an optical character recognition (OCR) operation on each of the thumbnails stored therein, thereby extracting text that is present in each of the thumbnails;
(c) a first processor configured to perform text vectorization for each brand using all of the text that is extracted from each of the thumbnails for each brand, wherein the text vectorization provides a numerical brand embedding for each brand;
(d) a brand embeddings database that stores the numerical brand embedding for each brand provided by the text vectorization, wherein the brand embeddings database includes a plurality of numerical brand embeddings provided by the respective text vectorizations; and
(e) a second processor configured to identify candidate brands for the ad clip of the query video advertisement by:
(i) performing text vectorization on OCR text of a thumbnail of the query video advertisement, thereby obtaining a numerical embedding for the query video advertisement, and
(ii) identifying highest-ranking candidate brands by identifying the numerical brand embeddings in the brand embeddings database which are closest to the numerical embedding for the query video advertisement,
wherein the candidate brands based on brand-level identification are the highest-ranking candidate brands;
(f) a third processor configured to compute numerical embeddings of the extracted text that is present in each of the thumbnails using a transformer-based model that is trained to learn contextual representation to differentiate between text for different brands;
(g) a clips embeddings database that stores the numerical embeddings for each of the extracted text that is present in each of the thumbnails, along with the corresponding brand, wherein the clips embeddings database includes a plurality of numerical embeddings; and
(h) a fourth processor configured to identify candidate brands for the ad clip of the query video advertisement by:
(i) computing a numerical embedding of OCR text of a thumbnail of the query video advertisement using the transformer-based model, and
(ii) identifying highest-ranking candidate brands by identifying the numerical embeddings in the clips embeddings database which are closest to the numerical embedding of the query video advertisement,
wherein the candidate brands based on clip level identification are the highest-ranking candidate brands; and
(i) a comparator configured to compare the highest-ranking candidate brands identified by the brand level identification of candidate brands with the highest-ranking candidate brands identified by the clip level identification of candidate brands, and generate a common brand list,
wherein when the common brand list is non-empty, the brands in the non-empty list are the candidate brands for the ad clip of the query video advertisement.

9. The apparatus of claim 8 wherein when the common brand list is non-empty, a predicted brand is selected from the common brand list based on having a numerical embedding having a closest cosine distance from the numerical brand embeddings in the brand level embeddings.

10. The apparatus of claim 8 wherein the text vectorization for each brand is performed by:
  (i) concatenating all of the text for each brand from each of the different advertisements for the respective brand into a single text,
  (ii) obtaining Term Frequency-Inverse Document Frequency (TF-IDF) embeddings for the single text of each brand, and
  (iii) performing Truncated Singular Value Decomposition (TSVD) on the TF-IDF embeddings for the single text of each brand to reduce dimension of the numerical brand embedding.

11. The apparatus of claim 8 wherein the text vectorization performed on the OCR text of a thumbnail of the query video advertisement is the same text vectorization that is performed for the text extracted from the thumbnails of the video advertisements in the curated database.

12. The apparatus of claim 8 wherein the first processor is further configured to create additional numerical embeddings for brands having less than a predetermined number of video advertisements by:
  (i) adding noise to the extracted text for one or more of the existing video advertisements for the brand to create one or more additional extracted text, and
  (ii) creating one or more additional numerical embeddings from the one or more additional extracted text so that the total number of distinct numerical embeddings for the brand is at least equal to the predetermined number of video advertisements,
  wherein the numerical embeddings stored in the clips embeddings database for each of the extracted text that is present in each of the thumbnails also includes the numerical embeddings for the additionally created numerical embeddings.

13. The apparatus of claim 12 wherein the predetermined number of video advertisements is at least five video advertisements.

14. The apparatus of claim 8 wherein the transformer-based machine learning model is a Bidirectional Encoder Representations from Transformers (BERT) language model.

* * * * *